(12) United States Patent
Khoo et al.

(10) Patent No.: US 9,243,117 B2
(45) Date of Patent: Jan. 26, 2016

(54) ELASTOMERIC RUBBER AND RUBBER PRODUCTS WITHOUT THE USE OF VULCANIZING ACCELERATORS AND SULFUR

(75) Inventors: Siong Hui Khoo, Maran (MY); Lawrence Siau Tian Lim, Sungai Pinang (MY); Seek Ping Lee, Petaling Jaya (MY); Eng Long Ong, Petaling Jaya (MY); Norihide Enomoto, Tokyo (JP)

(73) Assignees: KOSSAN SDN BHD, Klang (MY); MIDORI ANZEN CO., LTD, Tokyo (JP)

( * ) Notice: Subject to any disclaimer, the term of this patent is extended or adjusted under 35 U.S.C. 154(b) by 794 days.

(21) Appl. No.: 13/513,242

(22) PCT Filed: Dec. 1, 2009

(86) PCT No.: PCT/MY2009/000201
§ 371 (c)(1),
(2), (4) Date: Jun. 1, 2012

(87) PCT Pub. No.: WO2011/068394
PCT Pub. Date: Jun. 9, 2011

(65) Prior Publication Data
US 2012/0246799 A1    Oct. 4, 2012

(51) Int. Cl.
| *A41D 19/015* | (2006.01) |
| *C08L 9/04* | (2006.01) |
| *C08K 3/22* | (2006.01) |
| *C08J 5/02* | (2006.01) |

(52) U.S. Cl.
CPC ... *C08J 5/02* (2013.01); *C08K 3/22* (2013.01); *C08J 2309/04* (2013.01); *C08J 2313/02* (2013.01); *C08L 9/04* (2013.01)

(58) Field of Classification Search
CPC .................................. C08L 9/04; C08K 3/22
USPC ......................................... 524/432; 264/306
See application file for complete search history.

(56) References Cited

U.S. PATENT DOCUMENTS

| 5,997,969 | A | 12/1999 | Gardon |
| 6,624,274 | B1 | 9/2003 | Suddaby |
| 6,673,871 | B2 | 1/2004 | Warneke et al. |
| 7,005,478 | B2 | 2/2006 | Williams et al. |
| 7,374,711 | B2 | 5/2008 | McGlothlin et al. |
| 2003/0017286 | A1 | 1/2003 | Williams et al. |
| 2004/0132886 | A1 | 7/2004 | Tao et al. |
| 2006/0057320 | A1 | 3/2006 | Huang |
| 2007/0033704 | A1* | 2/2007 | Wang ................. A41D 19/0058 2/168 |
| 2009/0118435 | A1 | 5/2009 | Van Jole |
| 2013/0191964 | A1 | 8/2013 | Khoo et al. |
| 2013/0198933 | A1 | 8/2013 | Khoo et al. |

FOREIGN PATENT DOCUMENTS

WO    2004044037 A1    5/2004

OTHER PUBLICATIONS

International Search Report for PCT/MY2009/000201, dated Feb. 19, 2010.
Claims filed in U.S. Appl. No. 13/877,054, filed Jul. 14, 2015, in response to the Office action of Jan. 15, 2015 for that application.

* cited by examiner

*Primary Examiner* — James J Seidleck
*Assistant Examiner* — Deve E Valdez
(74) *Attorney, Agent, or Firm* — Pearne & Gordon LLP

(57) ABSTRACT

A composition for producing an elastomeric thin film comprising a carboxylated acrylonitrile polybutadiene latex which is vulcanized without the use of conventional sulphur and accelerators thereby reducing the possibility of contacting immediate Type I hypersensitivity and delay Type IV hypersensitivity caused by the presence of natural rubber latex proteins and accelerators respectively. The dipping process for making gloves by using a latex composition provided by: premixing carboxylated acrylonitrile polybutadiene latex with methacrylic acid, or alternatively using a self-crosslinked latex, adding zinc oxide, adjusted to 9 to 10 of the pH level, and diluted with water to obtain 18% to 30% by weight of total solid content; dipping the glove former into the composition to form a layer of thin film of the latex composition on the former; drying the thin latex film on the former and crosslinking the latex film on the former.

21 Claims, No Drawings

ELASTOMERIC RUBBER AND RUBBER PRODUCTS WITHOUT THE USE OF VULCANIZING ACCELERATORS AND SULFUR

The present application is the national phase of International Application No. PCT/MY2009/000201, entitled "ELASTOMERIC RUBBER AND RUBBER PRODUCTS WITHOUT THE USE OF VULCANIZING ACCELERATORS AND SULFUR", filed on Dec. 1, 2009. The entire disclosure thereof is incorporated herein by reference.

REFERENCE CITED

Foreign Patent Documents

Patent Document 1: U.S. Pat. No. 5,014,362.
Patent Document 2: JP Patent Publication No. 53-125139.
Patent Document 3: JP Patent Publication No. 52-121653.
Patent Document 4: JP Patent Publication No. 53-85842.
Patent Document 5: JP Patent Publication No. 8-19264.
Patent Document 6: JP Patent No. 3517246, JP Patent Indication No. 2000-503292.
Patent Document 7: JP Patent Indication No. 2002-527632.
Patent Document 8: U.S. Pat. No. 6,673,871B2, JP Patent Publication No. 2004-526063.
Patent Document 9: JP Patent Indication No. 2008-512626.
Patent Document 10: JP Patent Laid-open Publication No. 2008-545814.
Patent Document 11: U.S. Pat. No. 7,005,478.

Other Publications

Document 1: "Cross-linking in carboxylated nitrile rubber dipped films" by Andrew Kells and Bob Grobes, LATEX 24-25, January 2006, Frankfurt, Germany.
Document 2: "Tailored synthetic dipping latices: New approach for thin soft and strong gloves and for accelerator-free dipping" by Dr. Soren Buzs, LATEX 23-24, January 2008, Madrid, Spain.

FIELD OF THE INVENTION

The present invention relates to an elastomeric rubber glove product made of a crosslinked elastomeric rubber film which is manufactured by producing on a mold or former a deposited layer of a composition which has been prepared by adding methacrylic acid to a carboxylated acrylonitrile butadiene latex or using a self-crosslinked carboxylated acrylonitrile butadiene latex and subjecting the deposited layer to a vulcanization process without the use of vulcanizing accelerators and free sulfur.

BACKGROUND OF THE INVENTION

Natural rubber latex has been used in the manufacturing dipped latex products such as rubber medical gloves for many years. The natural rubber latex medical gloves so produced have excellent elastic properties and superior barrier performance against the transmission of blood-bourn pathogens. The manufacturing of the natural rubber gloves involves a vulcanizing process whereby free sulfur, which acts as a vulcanizing agent and chemicals which act as accelerators in the vulcanization process, are added to natural rubber latex. More specifically in rubber glove manufacturing, a mold or former in the shape of a hand is dipped, in one or several times, into the emulsion of natural rubber latex compounded with the addition of sulfur and accelerators, until a rubber film of the desired thickness is deposited. The rubber glove having the desired thickness is then dried and vulcanized at elevated temperature. The vulcanization process is essential to impart highly elastic properties to natural rubber film. The resulted rubber glove product made from the natural rubber latex has favorable barrier performance, mechanical properties and physical properties.

The natural rubber latex contains less than 5% of non-rubber such as proteins, lipids and trace elements. It is also recognized that the increase use of natural rubber latex medical gloves in the hospital settings has resulted in certain users developing Type I hypersensitivity. This immediate type I hypersensitivity in users of natural rubber latex gloves is caused by the residual extractable latex proteins present in natural rubber gloves. The immediate hypersensitivity, which usually occurs in less than two hours after contact, is an allergic response mediated by IgE (an antibody found in the circulation). On the skin, this can present as hives that migrate beyond the point of contact with latex. Systemic allergic symptoms can include itching eyes, swelling of lips or tongue, breathlessness, dizziness, abdominal pain, nausea, hypotension, and very rarely anaphylactic shock. People who have developed sensitization caused by natural rubber latex proteins are advised to avoid further contact with natural rubber latex and products made from natural rubber latex.

Synthetic latices such as nitrile latex, carboxylated nitrile latex, polychloroprene latex, or polybutadiene latex do not contain proteins. It is therefore recommended that those people who have developed protein allergy should use only synthetic latex gloves that are made from either nitrile latex, carboxylated nitrile latex, polychloroprene latex, or polybutadiene latex. Some of the gloves made from these synthetic latices are reported to have equivalent or better physical properties compared to natural rubber latex gloves but the barrier performance of the synthetic latex gloves are not as good as those of natural rubber latex gloves.

The manufacturing of synthetic rubber medical gloves adopts almost the same process used in the manufacture of natural rubber latex medical gloves.

Using the same procedure, a thin film of desired thickness of the synthetic elastomeric latex compound is deposited on a mold or former of the hand shape, dried, and vulcanized, whereby the resultant thin elastomeric rubber glove product has the desired mechanical and physical properties. For the purpose, a variety of synthetic elastomers gloves have been developed and introduced in the market. Carboxylaated nitrile rubber is the most common material used in making synthetic rubber gloves.

Manufacturing of rubber gloves made from natural rubber latex and synthetic latex very often use an accelerated sulfur vulcanization system whereby chemicals such as dithiocarbamate, tetramethyl thiuram disulfide (TMTD) and mercaptobenzothiazole (MBT) are used as accelerators in the sulfur-based vulcanization process. These accelerators, as the name implies, are used to enhance the rate of vulcanization. Without the use of accelerators, the vulcanization process using sulfur alone will be very slow requiring several hours at high temperature of 140 C.

Extensive use of these accelerators in the rubber gloves manufacturing industry has created another health-related issue. These accelerators can give rise to the delay Type IV hypersensitivity such as allergic contact dermatitis. The delayed type IV hypersensitivity usually occurs 24-72 hours after contact. The reaction is usually localized rashes, redness of the skin, sometimes with, cracking and blistering of the skin, usually on the wrists or hands.

Switching from natural rubber latex gloves to nitrile latex gloves to avoid Type I hypersensitivity may therefore induce the occurrence of Type IV hypersensitivity if the nitrile gloves are found to have excessive residual accelerators. The industry is therefore looking for a synthetic glove manufacturing process without the use of sulfur vulcanization system and thus eliminating the use of accelerators. In the case of carboxylated nitrile latex, crosslinking without the use of sulfur and accelerators will therefore involve a unique, non-conventional process requiring the zinc ions, present as zinc oxides for example, to participate in the ionic as well as the covalent bond crosslinking mechanism. This technology is urgently needed in spite of its difficulty. This is the gist of the current invention.

Depicted in U.S. Pat. No. 5,014,362 (as Patent Document 1 in this specification) is a carboxylated nitrile rubber which is subjected to the vulcanization process with the help of zinc oxide and sulfur.

A carboxylated nitrile rubber typically comprises acrylonitrile, butadiene, and organic acid segments of various composition ratio. It is possible to produce covalent bond crosslinking in the sub segment of butadiene using sulfur and accelerators. Also, the vulcanization of the carboxylated acrylonitrile part (organic acid) can be effected by ionic bonds using metal oxides such as zinc oxide or other metal salts.

The crosslink of covalent bonds with the help of sulfur can significantly improve the durability of rubber in contact with oils and chemicals. In addition, the addition of zinc oxide encourages the production of the ionic bonds of zinc ions. The ionic crosslinking with the help of zinc ions will increase the tensile strength, the force at break and the abrasive resistance as well as the elastic modulus of the rubber film.

In case that the crosslinking mechanism depends simply on the ionic bonds, the resistance to oils and chemicals will be declined resulting in the rubber products having lower quality reliability.

It is now taught in common that the crosslinking of carboxylated nitrile rubber products such as gloves is effectively implemented by a combination of the covalent bond crosslinking with the help of sulfur and accelerators and the ionic crosslinking with the help of metal oxide such as zinc oxide or metal salts.

The use of accelerators in the vulcanization process, however, will create health related issue of delayed Type-IV hypersensitivity.

It is widely known that the strength of rubber is improved by adding zinc dimethacrylate and/or basic zinc methacrylate to the rubber in order to promote the polymerization with organic peroxide.

More specifically, the mixing of poly-butadiene with methacrylic acid and then with zinc oxide produces a composition having improved abrasive resistance (See Patent Document 2 of JP Patent Laid-open Publication No. 53-125139 and Patent Document 3 of JP Patent Laid-open Publication No. 52-121653). The adding of non-polymeric carboxylic acid to a mixture of diene rubber, methacrylic acid, zinc oxide, and organic peroxide produces a blend which is improved in the tensile strength (See Patent Document 4 of JP Patent Laid-open Publication No. 53-85842). The use of methacrylic acid, zinc oxide, and peroxide enables the crosslinking in NBR but without the presence of the ionic bonds.

A soft nitrile rubber product is provided which is as high in the tensile strength and the resistance to chemicals when the crosslinking is carried out with the help of zinc oxide or a sulfur curing accelerator. The resulting rubber product is softer than any conventional like product (See Patent Document 6 of JP Patent No. 3517246 or JP Patent Indication No. 2000-503292). The vulcanizing accelerator is tetramethyl-thiuram-disulfide combined with mercaptobenzothiazole (MBT). The resultant soft nitrile rubber which is a product of the relevant reaction will hence contain sulfur.

The carboxylated nitrile rubber which is a copolymer of acrylonitrile, butadiene, and unsaturated carboxylic acid allows the ionic bonds to be produced in the carboxy group with zinc ions. However, it is difficult to produce covalent bond-crosslinking in a compound using zinc ions. It is hence essential to use a minimum dosage of sulfur to provide covalent crosslinking. More particularly, a method of manufacturing a glove product is depicted in JP Patent Publication No. 2002-527632 (Patent Document 7 in this specification) where the crosslinking is achieved by adding 1 to 3 phr of sulfur and 0.5 phr of multivalent metal oxide to carboxylated nitrile rubber which is a copolymer of acrylonitrile, butadiene, and unsaturated carboxylic acid.

In U.S. Pat. No. 6,673,871B2 (Patent Document 8 in this specification), an elastomer product such as a glove product is disclosed where the crosslinking agent is a metal oxide such as zinc oxide without the use of conventional sulfur and accelerators. The elastomer used is a polybutadiene latex which is not carboxylated and the product can be vulcanized at temperatures less than 100 C. and more particularly at temperatures less than 85 C. A corresponding Japanese patent, JP Patent Laid-open Publication No. 2004-526063 (Patent Document 8) is disclosed where the crosslinking in the synthetic polymer described previously is carried out without the use of accelerators. More particularly, it claims from a series of examinations to feature a step of forming an elastomer film which contains no sulfur where the vulcanization process is carried out at a temperature of not higher than 85° C. with the use of a metal oxide such as zinc oxide for conducting the sulfur substitution. It is however found that the vulcanization consisting mainly of a metal oxide is feasible only with some practical difficulties.

Non-patent Document 1 ("Cross-linking in carboxylated nitrile rubber dipped films" by Andrew Kells and Bob Grobes, LATEX 24-25, January 2006, Frankfurt, Germany) is appended where it is shown that to obtain carboxylated nitrile latex gloves with acceptable durable properties, a small amount of sulfur with the use of vulcanizing accelerators such as type tetramethyl thiuram (TMTD), 2,2'-dithio-bis(ben-zothiazole)-(MBTS), N-cyclohexylbenzothiazole-2-sulfina-mide (CBS), and zinc diethyldithiocarbamate (ZDEC) are required in addition to zinc oxide. It is apparent that it is difficult to produce durable carboxylated nitrile latex gloves without the use of sulfur and sulfur-based accelerators. While the attempt for manufacturing a glove product from the self-crosslinked material is disclosed, the action of self-crosslinking as well as the process needed to produce the desired gloves was not explained in the technical paper. It is true that the technology for implementing the self-crosslinking latex falls short of its acceptable goal.

Non-patent Document 2 ("Tailored synthetic dipping latices: New approach for thin soft and strong gloves and for accelerator-free dipping" by Dr. Soren Buzs, LATEX 23-24, January 2008, Madrid, Spain) is appended teaching one promising direction of the technology that the alternative crosslinking process in NBR latex includes a direct covalent crosslinking by functional reactive groups (R) and the ionic crosslinks produced with the help of zinc oxide with the carboxyl groups of the NBR latex. More specifically, the method of vulcanization comprises substantially direct covalent bonding of polymer chains for R bonds and ionic bonding with the help of the carboxy group and zinc oxide. Under laboratory condition, the vulcanization temperature can be reduced from 120° C. to 85° C. The direction of the technology states that the R bonds derived from the covalent bonds linked directly from polymer chains are featured in addition to the ionic bonds bridging with the help of the carboxy group and zinc. Unfortunately, the approach fails to clarify what is the nature of the functional group R which acts in the covalent crosslinking and the actual method of constructing the same.

Disclosed in JP Patent Indication No. 2008-512626 (Patent Document 9) is a polymer latex manufactured by the radical emulsion polymerization where the soft phase part has a unit structure based on a group of separately conjugated diene, ethylene-form unsaturated mono-carboxylic acid, ethylene-form unsaturated dicarboxylic acid, and their anhydride, mono-ester and mono-amide, (meta)acrylonitrile, styrene, substituted styrene, □-methylstyrene, alkylester having 1 to 10 carbons in (meta)acrylic acid, amide in (meta)acrylic acid, N-methylol amide group, ethylene-form unsaturated compound containing their ester derivative and ether derivative, and their mixture while the hard phase part has a unit structure of monomer selected separately from a group of ethylene-form unsaturated mono-carboxylic acid, unsaturated dicarboxylic acid, and their anhydride, mono-ester and mono-amide, (meta)acrylonitrile, styrene, substituted styrene, □-methylstyrene, ester of C1 to C4 in (meta)acrylic acid, amide in (meta)acrylic acid, and their mixture.

It is presumed in that invention that the crosslinking is implemented by the covalent bonds in the soft phase part. In particular, metal components such as zinc ions are not used.

Disclosed in JP Patent Laid-open Publication No. 2008-545814 (Patent Document 10) is an elastomer product manufactured by the steps of (a) preparing a carboxylated nitrile butadiene rubber composition which comprises 0.25 to 1.5 parts of zinc oxide for 100 parts of dry rubber, alkali for having greater than 8.5 of the pH level, a stabilizing agent, and one or more accelerators selected from a group of guanidine, dithiocarbamate, and thiazol compound, if desired, (b) dipping a former in the carboxylated nitrile butadiene rubber composition, and (c) curing the carboxylated nitrile butadiene rubber product.

Crosslinking is done with the help of zinc oxide. For permitting the product to have a desired degree of the resistance to chemicals, crosslinking accelerators are used. The vulcanizing accelerator used is a dithiocarbamates. For improving the resistance to chemicals, a mixture of the dithiocarbamate accelerator, diphenyl guanidine, and zinc mercaptobenzothiazole used to ensure higher effects. This disclosure employs crosslinking of rubber using sulfur and accelerators, the gloves produced will have the problems of Type IV hypersensitivity.

Disclosed in the specification of U.S. Pat. No. 7,005,478 (Patent Document 11) is an elastomer product of which the elastomer having carboxy groups is produced by the reaction with (a) a carboxylic acid or its derivatives, (b) a bivalent or trivalent metal contained compound, and (c) an amine or amino compound, and (d) a neutralizing agent for neutralizing at least a part of the carboxyl group in a base polymer. During the reaction, none of the accelerators, thiuram, and carbamate is used. The base polymer may be selected from natural latex rubber, synthetic latex polymer (e.g., acrylonitrile), or butadiene rubber such as synthetic butadiene rubber, and carboxylated butadiene rubber. Also, carboxylated acrylonitrile latex is not used. This reaction requires essentially (c) the amine or amino compounds. The amine group or amino group is used to solubilize the divalent or trivalent metal salts that can then react with the carboxylic derivatives to form ionic bonds. The complex solubilization process will disturb the stable reaction of ionic crosslink.

DISCLOSURE OF THE INVENTION

The present invention overcomes the above-described problems associated with medical gloves by providing a new vulcanization method to synthetic latex formulation that do not use sulfur and accelerators as the vulcanizing chemicals. As such, Type IV delay hypersensitivity caused by accelerators is prevented. In addition, since natural rubber latex is not used in the present invention, Type I hypersensitivity caused by the presence of natural rubber latex proteins is also prevented.

The latex formulation disclosed in the present invention comprises a base latex which is either a self-crosslinked carboxylated nitrile latex or a conventional carboxylated nitrile latex, a divalent metal salt, a pH adjustor, antioxidants and colorant. If the latex used is a conventional carboxylated nitrile latex, a premixing step of the latex with a methacrylic acid or its derivative has to be performed. The latex of the present formulation is then vulcanized at high temperature in order to provide vulcanized films and the gloves with the desired physical properties.

The carboxylated nitrile latex refers to the copolymer dispersion formed by the emulsion copolymerization of butadiene, acrylonitrile and a carboxylic acid. For the carboxylated nitrile latex that has the residual unsaturation of the butadiene sector, crosslinking can be formed using the conventional sulfur/accelerator zinc oxide combination, which is the same combination used to crosslink natural rubber. The present formulation does not use any sulfur and accelerators that have been associated with the Type IV hypersensitivity. In the present invention, covalent crosslinking of carboxylated nitrile latex is achieved through the reaction of the polymer with acrylic acid or its derivatives and zinc oxide.

We, the inventors, have found through intensive studies that the above described problems can be solved by the following teachings.

(1) The glove product having the foregoing advantages is manufactured by preparing a composition characterized by mixing carboxylated acrylonitrile butadiene with methacrylic acid, and zinc oxide, adjusted to pH9 to pH10, and added with water so that 18% to 30% by weight of solid phase substances are contained, forming a deposition layer of the composition on a mold or former, and subjecting the deposition layer to a crosslinking process.

When the mixing of carboxylated acrylonitrile butadiene with and methacrylic acid is carried out in advance, the carboxylated acrylonitrile butadiene having a self-crosslink property can be used with much ease. Using the same steps as described above, the self-crosslinked carboxylated acrylonitrile butadiene latex is then mixed with zinc oxide, adjusted to pH9 to pH10, and added with water so that 18% to 30% by weight of solid phase substances are contained before its composition is shaped in the form of a deposition layer on a mold or former and subjected to a crosslinking process to have a final glove product.

(2) The glove product after the non-sulphur crosslinking process according to the present invention is made of a thin film of elastomer rubber which has favorable physical properties. The physical properties of the thin film grove product are comparable to those from conventional glove product made of a thin film of elastomer rubber where the crosslinking is carried out with the use of zinc compound, sulfur and accelerators. It is thus judged from the foregoing fact that the crosslinking process according to the present invention is implemented by, in addition to the ionic bonds with the help of zinc ions, the covalent bonds based on the zinc compound which corresponds to the covalent bonds with the help of sulfur.

(a) As described in the present invention, the composition is prepared by carboxylated acrylonitrile butadiene mixed with methacrylic acid, and zinc oxide, adjusted to pH9 to pH10, and dissolved in water so that 18% to 30% by weight of solid phase substances are contained before its deposition layer is formed on a mold or former and subjected to the crosslinking process.

(b) To ensure that the final rubber gloves having the physical properties are produced, it is practical to include in the formulation, the addition of a dispersant, an anti-oxidizing agent, and titanium dioxide and, if desired, a coloring agent and a defoaming agent.

ADVANTAGES OF THE INVENTION

According to the present invention, a glove product can be made from a novel thin film prepared by mixing carboxylated acrylonitrile butadiene latex with methacrylic acid, and zinc oxide, adjusted to pH9 to pH10, and added with water to produce the desired total solid content, deposited on a glove former, dried while containing the solid phase substances, and subjected to the crosslinking process. One advantage of the glove product made from the novel thin film is that the formulation used does not use any sulfur and accelerators for the vulcanization process.

Also, the glove product is almost equal to or better than any conventional glove product in the physical properties including the elastic behaviour, the tensile strength, elongation at break, tear strength, and the quasi-nail tear strength as well as in the chemical properties including the thermally aging resistance and the resistance to chemicals. Another significant advantage of the present invention is that the health related issues of Type I and Type IV hypersensitivities caused by natural rubber latex proteins and accelerators respectively are avoided, as compared with any conventional glove product which fails to overcome these problems.

BEST MODES FOR EMBODYING THE INVENTION

A thin film of elastomer rubber according to the present invention is manufactured from a chemical composition described below.

The latex composition is prepared from carboxylated acrylonitrile butadiene latex, which is mixed with methacrylic acid, and zinc oxide, adjusted to pH9 to pH10, and added with water so that about 18% to 30% by weight of total solid contents are contained.

The carboxylated acrylonitrile butadiene latex comprises 26% to 30% by weight of acrylonitrile, 65% to 58% by weight of butadiene, and 6% to 8% by weight of methyl-methacrylic acid (the total being 100% by weight).

The components and their composition ratios are widely known. The latex is generally produced through an emulsion polymerization process.

The glass transition temperature (Tg) of the resultant polymer ranges substantially from −15° C. to −30° C. The polymers are available as commonly marketed products which include, for example, Polymer Latex X-1138 supplied from Polymer Latex Gmbh, Nantex 635t supplied from Nantex Industries, and Synthomer 6322 supplied from Synthomer Company.

The mixing of carboxylated acrylonitrile butadiene latex with methacrylic acid which is carried out in advance allows the carboxylated acrylonitrile butadiene to easily have a self-crosslink property.

It is presumed that the carboxylated acrylonitrile butadiene mixed with methacrylic acid will react with the zinc oxide provided later in the form of ionomers.

The amount of methacrylic acid needed should be in the range of 2 to 8% by weight. If methacrylic acid is added more than 8% by weight which exceeds the range from 2% to 8% by weight, it remains at the not-reacted state in the product. In case that methacrylic acid is added smaller than 2% by weight, its content becomes short thus failing to provide a satisfactory result.

Alternatively, if a pre-mixing stage of carboxylated acrylonitrile butadiene with methacrylic acid is not carried out, a self-crosslinked carboxylated acrylonitrile polybutadiene latex (e.g. 746 SXL-XNRR from Synthomer) is used successfully as a replacement. It may also be selected from Pure Protect at Polymer Latex Gmbh and Polyac 560 at Shin Foong Company.

0.5 to 3.0 phr of zinc oxide is added to the premixed carboxylated acrylonitrile butadiene latex with zinc methacrylate and methacrylic acid or the self-crosslinked carboxylated acrylonitrile polybutadiene latex.

The self-crosslinked carboxylated acrylonitrile butadiene latex or the premixed carboxylated acrylonitrile butadiene latex with methacrylic acid, added with zinc oxide is then adjusted to pH 9 to 10. The adjustment to pH 9 to 10 involves mixing the latex with an alkali substance which acts as the pH adjuster. The alkali substance may commonly be KOH. More particularly, 0.1 to 2.0% by weight of the alkali substance is added to 100% by weight of carboxylated acrylonitrile butadiene latex.

About 0.1 to 2.0% by weight of the dispersant per 100 phr of the self-crosslinked carboxylated acrylonitrile butadiene latex or the premixed carboxylated acrylonitrile butadiene latex with methacrylic acid, and zinc oxide and adjusted to pH 9 to 10.

The dispersant may be an anionic surface active agent. More specifically, the dispersant is selected from the sodium salts of naphthalinesulfonic acid polycondensate, e.g. Tamol NN 9104.

A further 0.1 to 1.5% by weight of an antioxidant per 100 phr of carboxylated acrylonitrile butadiene latex is added to latex mixture.

The antioxidant may be a polymeric, hindered phenolic, non-staining type such as Wingstay L.

A further 0.2 to 3.0% by weight of titanium dioxide per 100 phr of carboxylated acrylonitrile butadiene latex is added to the carboxylated acrylonitrile butadiene latex mixture for the purpose of whitening or color enhancement.

If required, a coloring agent is added to the mixture. The coloring agent may be an organic dye.

The final latex composition is then adjusted with water to obtain a total solid content of about 18 to 30% by weight.

The following table (Table 1) summarized the proposed general latex formulation used in the present invention.

TABLE 1

General latex formulation phr

| | |
|---|---|
| Synthomer 746-SXL or Premixed latex | 100 |
| KOH | 0.1~2.0 |
| Zinc oxide | 0.5 to 4 |

TABLE 1-continued

General latex formulation
phr

| | |
|---|---|
| Titanium dioxide | 0.2~3 |
| Dispersant | 0.5 to 2 |
| AntiOxidant | 0.1~1.5 |
| Colorant | |
| Water to adjust Total Solid Content to 18% to 30% | |

EXAMPLE OF THE INVENTION

To illustrate the present invention of produce the elastomeric thin film without sulphur and accelerators, a self-crosslinked carboxylated nitrile latex under the trade name Synthomer 746-SXL sold by Synthomer was mixed with potassium hydroxide, zinc oxide, titanium dioxide, antioxidant, a colorant and water according to the concentration listed in Table 2 If a premixed latex is used instead of the self-crosslinked latex, the premixing latex is obtained by mixing 100% by weight of carboxylated acrylonitrile butadiene with 7% by weight of methacrylic acid.

TABLE 2

Example 1 Latex formulation
phr

| | |
|---|---|
| Synthomer 746-SXL or a premixed latex compound | 100 |
| KOH | 1.35 |
| Zinc oxide | 1.2 |
| Titanium dioxide | 0.75 |
| Anti Oxidant | 0.25 |
| Colorant | 0.05 |
| Water | AdjustTo TSC 20-21% |

Example 2

Glove Production Steps

The thin film article of a glove is then produced using the compounded latex, cited in Table 2 according to the dipping process described below:

1. Preparation of Glove Formers

The process starts with the cleaning of a glove former and then a coagulant coating step where a coagulant is applied to the surface of the glove former for permitting the latex composition to adhere easily to the surface of the former before it is used in the following dipping process.

A mold or former in the shape of a hand to be used for making a medical glove, was subjected to a cleaning process using a cleaning solution, brushed for removing dirt, and rinsed with cool water and then dried.

The dry former is now ready to be used in the dipping process which can either be a straight dipping or a coagulant dipping process, depending on the type of product made.

The straight dipping process will first involve the dipping of the dry former for the desired article directly into the compounded latex prepared using the formulation of the invention.

2. Coating the Glove Former Surface with a Coagulant.

For making glove, the former is in the shape of a hand and the coagulant dipping process is chosen. The coagulant dipping process will involve the dipping of the dry hand former into a coagulant tank which contains calcium ions. The calcium ions are prepared in the form of a solution of calcium nitrate or calcium chloride. The concentration of the calcium ions is preferably in the range of 5.0% to 20.0%, more preferably 8.0% to 17.0%. Also included in the coagulant solution is the wetting and anti-tack agents such as zinc stearate and calcium stearate. The amount of wetting agent and anti-tack agent used will depend on the degree of wetting and the reduction of tackiness of gloves required.

3. Step of Applying the (Latex) Composition to the Glove Former Coated with the Coagulant.

Once the former is dipped and coated with the coagulant, it is allowed to dry or partially dry at temperature between 50 to 70 degree C. and then dipped into a tank containing the compounded latex prepared using the formulation of the invention. The former is dipped for a specific time to ensure that the former is properly coated and the thickness of the glove is not too thick. The dipping time of the former in the latex tank will depend on the total solid content (TSC) of the compounded latex and the thickness of the coating required, varying between 1 to 20 seconds, preferably 12 to 17 seconds.

4. Step of Multiple Dipping

The latex coated former is then allowed to dry at 80 to 120 degree C. for 20 to 70 seconds depending on the temperature. If double dipping is required, the dry or partially dry latex coated former is then dipped again into another latex tank containing the latex having the same formulation of the invention. In the case of double dipping, the concentration of the total solids of the compounded latex will be reduced so that the final thickness of the glove meets the desired range of thickness. The coated former is then allowed to dry at 110 degree C. for 30 seconds.

5. Leaching Process

The partially dried latex coated former is then leached in the leaching tank containing hot water (30 to 70 degree C.) for 90 to 140 seconds.

6. Beading Process

Once the leaching process is completed, the latex film coated on the glove former is subjected to the beading process.

7. Oven Drying

The glove former is now dried at temperature between 80 to 120 degree C. for 250 to 300 seconds.

8. Vulcanization Process

The dried latex coated former is then vulcanized at 120 to 150 degree C. for 20 to 30 minutes. The high temperature curing is essential for the self-crosslinked latex to achieve the desired physical properties as the formulation does not contain any sulfur and accelerator as used in the conventional curing process.

9. Post Leaching Step and Chemicals Removing Step

The glove former covered with the vulcanized latex film is rinsed with water for removing any residual chemicals. This post leaching is carried out on another leaching tank containing water at 30 to 80 degree C. for 60 to 80 secs. This step was repeated two times.

10. Surface Treating Step

After the latex film has been dried and cured, if desired, it is dipped into a polymer solution tank containing other polymer solution to form another coating on the latex. In the case that the rubber product is a glove, the polymer film can be coated onto the latex glove surface to ease donning of the glove. Improving the donning of the latex glove can also be carried out using a chlorination process which can be carried out on-line on the dry and cured latex film. The on-line chlorination process typically consists of dipping the dry latex film coated former onto a tank containing chlorine solution, which reacts with the outer surface of the glove. Chlorination process is carried out to specifically reduce the tackiness of the glove and to facilitate donning the glove. The former coated with the chlorinated latex glove is then washed and dried.

Example 3

Comparative Examples

A medical glove made from using a self-crosslinked carboxylated acrylonitrile butadiene latex (a trade name, Synthomer SCL—XNBR 746 of Synthomer Company) was made according to formulation given in Table 2. This glove is compared with a glove made using a conventional carboxylated acrylonitrile butadiene latex (a trade name, Synthomer 6322 of Synthomer Company) with (1.5% by weight of) ZnO and (1.0% by weight of) sulfur to prepare a composition. The ingredients including zinc oxide, dispersing agent, pH adjuster, and anti-oxidant and their amount are identical to those of the examples. The resultant solid substances were 30% by weight. Using the steps of Example 2, a glove product (a trade name, Chemax) was manufactured from the composition.

Example 4

The result of comparison for element analysis between the glove product according to the present invention and the comparative product (Chemax)) is shown in Table 3.

The analysis test for examining the elements (ten elements including C, H, N, O, S, Zn, Ca, Cl, Na, and K) in the test pieces of the rubber gloves was conducted using a CHNO element analyzer (EA1110 model by CE Instruments) with an ICP-AES system. The quantitative analysis of Zn and Ca was carried out in which each post-evaporation test piece was precisely measured to 0.1 g, placed in a platinum crucible, dissolved in 2 g of a mixture solution ($Na_2CO_3:Na_2B_4O_7=2:1$), extracted using 30 ml of hydrochloric acid, diluted to 100 ml, and subjected to the quantitative analyzing action of an absorbance analyzer. The quantitative analysis of Cl was carried out in which each post-evaporation test piece was precisely measured to 1 g, placed in a platinum crucible, dissolved in an Eschka mixture, extracted using 100 ml of pure water and its resultant water solution was subjected to the quantitative analyzing action of an absorbance analyzer. Also for examining sulfur, the water solution was subjected to the quantitative analyzing action of an ICP emission spectroscopic analyzer.

TABLE 3

Comparison of elements present in gloves

| | \multicolumn{10}{c}{Elements} |
|---|---|---|---|---|---|---|---|---|---|---|
| | C | H | N | O | S | Zn | Ca | Cl | Na | K |
| Current | 77.9 | 9.8 | 7.1 | 3.0 | —* | 0.76 | 0.76 | 0.19 | 0.01 | 0.01 |
| Conventional | 73.1 | 9.2 | 6.6 | 4.9 | 1.10 | 1.15 | 0.62 | 0.16 | 0.02 | 0.02 |

—* Indicates non-detectable.

The Content of Sulfur

According to the present invention, the content of sulfur was as non detectable while the conventional product, Chemax contained 1.10 phr of sulfur. It was then proved that the product according to the present invention did not show any detectable level in the content of sulfur.

*The Content of Zinc

According to the present invention, the content of zinc was as small as 0.76 phr while the conventional product, V-710 (KLT-C), contained 1.10 phr of sulfur. It was then proved that the product according to the present invention was less in the content of zinc. As the content of zinc which may migrate is small, the hazardous properties can be diminished.

Example 5

Comparison of Soluble Acetone Component

The low molecular weight component in the rubber products was measured by a quantitative method for rubber solvent extraction, which conforms to JIS K6299, with 24-hour Soxhlet extraction using an acetone solvent. The quantitative analysis of the acetone extract was carried out using an infrared absorbance (FT-IR) spectroscopic analyzer.

The FT-IR analyzer was actually a Shimadzu IRP Prestage 21/FTIR-8400S machine. The measuring method employed a ATR technique (with diamond cell) with 40 times of calculating processes.

A swell test was also conducted for, in conformity with JIS K6310, immersing the rubber test piece in which the soluble acetone component had been removed, measuring the increase of the weight of the test piece after 72 hours at the room temperature, and calculating the swell rate of the test piece from the increase of its weight to find the crosslink density of the vulcanized rubber (i.e. it is commonly known that the degree of crosslinking of a rubber is related to the swelling ratio of the rubber. The higher the degree of crosslinking, the lower is the swelling ratio and vice versa.)

According to the present invention, the soluble acetone component was 15% while the conventional product, Chemax, contained 7.2% of the soluble acetone component. The swelling ratio of the product according to the present invention was 332% while the same of the conventional product, Chemax, was 286%. This indicates that the crosslink density of the conventional sulphur-accelerator system is higher than the current invention system without using sulphur and accelerators.

It was found from the infrared analysis of the soluble acetone component that not-reacted portions of the nitrile butadiene were present. In the product according to the present invention, the absorbing peak of the carboxylate group appeared at about 1700 $cm^{-1}$.

Example 6

The tensile properties of the carborxylated nitrile latex glove from the present invention and the conventional carboxylated nitrile latex glove were determined using the ASTM D-6319-00 test method.

The gloves were cured at 150° C. The sample gloves were kept for 24 hrs with humidity 50% and temperature 23° C. The gloves were also aged at 70° C. for 7 days. The tensile properties of the unaged gloves and aged gloves from the present invention and that from conventional method using sulphur and accelerators were presented in Tables 4 and 5 respectively.

TABLE 4

Physical properties of gloves produced using current invention

| Curing temperature | 150° C. | 150° C. Aging at 70 C. for 7 days |

TABLE 4-continued

Physical properties of gloves produced using current invention

| | | |
|---|---|---|
| Tensile Strength (MPa) | 26 | 34 |
| Elongation (%) | 620 | 640 |
| Modulus at 500% (MPa) | 9.8 | 12.6 |

TABLE 5

Physical properties of gloves produced using conventional sulphur and accelerators formulation

| | | |
|---|---|---|
| Curing temperature | 150° C. | 150° C. Aging at 70 C. for 7 days |
| Tensile Strength (MPa) | 26 | 26 |
| Elongation (%) | 600 | 620 |
| Modulus at 500% (MPa) | 12.3 | 10.6 |

The tensile strength of the gloves manufactured according to the present invention is comparable to the tensile strength of the gloves vulcanized using conventional sulphur and accelerators vulcanization system. The elongation is however, higher for the gloves produced under the current invention compared with that from the conventional product.

As a whole, the glove produced according to the present invention has better ageing properties compared to the gloves produced using the conventional sulphur and accelerators vulcanization system.

The latex composition will be explained again.

The latex composition is obtained by either using a self-crosslinked carboxylated acrylonitrile butadiene latex or a premixed latex which is prepared by mixing carboxylated acrylonitrile butadiene mixed with methacrylic acid, adjusted to pH9 to pH10, and adjusted with water so that 18% to 30% by weight of solid phase substances (for all the weight) are contained.

The glove product manufactured by the foregoing steps using formulation according to table 2 has the following advantages.

Advantage 1: Protection Against Immediate Type I Hypersensitivity

The product according to the present invention is advantageous since it does not employ natural rubber latex which is responsible to induce Type I hypersensitivity caused by the presence of latex proteins.

Protection Against Delayed Type IV Hypersensitivity:

The type IV of hypersensitivity is caused by the use of crosslinking accelerators which contain chemicals including thiuram, dithiocarbamate, and mercaptobenzothiazole during the production of the gloves. The present invention does not employ sulphur and accelerators in the vulcanization process, which are responsible to induce the delayed Type IV hypersensitivity.

Advantage 3: Favorable Physical and Chemical Properties

The latex formulation according to Table 2 provides a latex system having good film formation properties. This allows the gloves to have very thin film and yet superior barrier performance. The dimensions of the glove product are shown below. It is clear that the glove product is thinner than the conventional gloves (Table 6).

The physical properties are shown below (Table 7). It is clear that both the tensile strength and the elongation at break of the present product are comparable or higher than those of the conventional product.

TABLE 6

Dimensions of gloves from current invention

| | Thickness (Single wall) mm | | | |
|---|---|---|---|---|
| Mass of glove | At Thumb | At Palm | At Wrist | Length of glove mm |
| 4.5 gm | 0.12-0.13 | 0.08-0.09 | 0.06-0.07 | 245-250 |
| 3.5 gm | 0.10-0.11 | 0.07-0.08 | 0.05-0.06 | 245-250 |

TABLE 7

| | Mass of glove | 4.5 gm | 3.8 gm |
|---|---|---|---|
| Tensile Strength MPa | Immediately after production | 20-31 | 20-22 |
| | 3 months after Production | 21-32 | 21-23 |
| Elongation % | Immediately after production | 585-620 | 580-620 |
| | 3 months after Production | 585-620 | 580-620 |
| Force at break N | Immediately after production | 9.1-10.0 | 6.0-6.5 |
| | 3 months after Production | 9.0-9.8 | 5.8-6.2 |

Dermal Sensitization Study (Repeated Insult Patch Test)

Although the gloves made according to example 1 do not use sulphur and accelerators as the crosslinking system, a dermal sensitization study was carried out to evaluate the potential of the gloves not eliciting a delay Type IV hypersensitivity immunological response through its contact with the skin. The delayed Type IV hypersensitivity is due primarily to chemicals such as accelerators used in the conventional vulcanization process. The methodology used for the study was conducted in accordance with the regulations described in CFR Title 21, Parts 50, 56 and 312.

The objective of the study was to determine the irritation and/or sensitization potential of the gloves after repeated application under occlusive patch test conditions to the skin of human subjects. A total of 220 subjects, 35 males and 185 females were recruited for the test.

The test was conducted in two phases. In the induction phase, a sample of the glove film measuring approximately 1 in. by 1 in. square was placed directly onto a 3M occlusive surgical tape. The patch was applied to the back of each subject between the scapulae and waist. The procedure was performed and repeated every Monday, Wednesday and Friday until 9 applications of the test article had been made. The patches were removed 24 hours after application. Twenty-four hour rest period followed the Tuesday and Thursday removals and 48-hour rest periods followed each Saturday removal. Subjects returned to the testing facility and the site was scored by a trained examiner just before the next patch application.

At the end of the induction phase test, the test articles were removed and no further test was conducted for approximately two weeks. The Challenge Phase starts after this rest period. The challenge patch as applied to a virgin test site. The site was scored 24 and 72 hours after application for reactions at the time of removal. All subjects were instructed to report any delayed skin reactivity that occurred after the final Challenge patch reading.

The intensity of skin reaction is scored according to the following scoring criteria.

| Score | Effect |
|---|---|
| 0 | No evidence of any effect |
| + | Barely perceptible (Minimal, faint, uniform or spotty erythema) |
| 1 | Mild (Pink, uniform erythema covering most of the contact site) |
| 2 | Moderate (Pink-red erythema uniform in the entire contact site) |
| 3 | Marked (Bright red erythema with/without petechiae or papules) |
| 4 | Severe (Deep red erythema with/without vesiculation or weeping) |

Table 8 summarizes the test results conducted on the 220 subjects. None of the subjects showed any ill effect at all. A few of the subjects (total number 6) discontinued towards the end of the test. It was concluded that the gloves made according to example 1 did not induce clinically significant skin irritation nor show any evidence of induced allergic contact dermatitis in human subjects. Hence the results meeting the requirements for the Low dermatitis Potential Labeling Claims of FDA.

TABLE 8

Final score of the skin reactions induced by the test patches

| Final Score | Induction Phase Evaluation Number | | | | | | | | | Challenge Phase Virgin Site | |
|---|---|---|---|---|---|---|---|---|---|---|---|
| | 1 | 2 | 3 | 4 | 5 | 6 | 7 | 8 | 9 | 24 hr | 72 hr |
| 0 | 220 | 220 | 220 | 220 | 220 | 218 | 216 | 216 | 216 | 214 | 214 |
| 1 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 |

CONCLUSIONS

As indicated from the results shown above, the glove product made from the current invention is substantially equal in the physical properties to any conventional sulfur/accelerators vulcanized glove product. However the conventional glove products contain accelerators which can cause Type IV hypersensitivity. Gloves produced from the present invention do not use any of these chemicals and are shown not to have any skin reactions thus ensuring a significant level of safety to the human body. It is found through examinations that the residual level of zinc substances was a minimum. The gloves also have the added advantage of having better ageing behavior.

The invention claimed is:

1. A formulation for making an elastomeric rubber thin film without using sulfur and accelerators comprising:
   a carboxylated acrylonitrile butadiene latex;
   a metal oxide;
   a pH adjuster to obtain a pH of 9-10;
   and water; wherein:
   the water is added to provide a total solid concentration (TSC) in the formulation between 18-30%; and
   the carboxylated acrylonitrile butadiene latex is a self-crosslinked carboxylated acrylonitrile butadiene latex.

2. A composition according to claim 1, wherein the carboxylated acrylonitrile butadiene latex is made from carboxylated acrylonitrile butadiene comprising 26% to 30% by weight of acrylonitrile, 65% to 58% by weight of butadiene, and 6% to 8% by weight of carboxylic acid (the total being 100% by weight).

3. A composition according to claim 1, wherein the carboxylated acrylonitrile butadiene latex is made from carboxylated acrylonitrile butadiene that is premixed with methacrylic acid in advance having 2% to 8% by weight of methacrylic acid for 100% by weight of the carboxylated acrylonitrile butadiene latex.

4. The composition according to claim 1, wherein the metal oxide is a divalent metal oxide.

5. The composition according to claim 4, wherein the divalent metal oxide comprises one or a mixture of divalent metal oxide selected from the group consisting of zinc oxide, magnesium oxide and barium oxide.

6. The composition according to claim 5, wherein the divalent metal oxide is zinc oxide.

7. The composition according to claim 6, wherein the amount of zinc oxide is 0.5-4 pphr.

8. The composition according to claim 1, wherein the pH adjustor is potassium hydroxide.

9. The composition according to claim 1, further comprising a titanium dioxide dispersion.

10. The composition according to claim 1, further comprising an antioxidant.

11. The composition of claim 1, further comprising a colorant.

12. A composition according to claim 2, wherein the carboxylated acrylonitrile butadiene latex is made from carboxylated acrylonitrile butadiene that is premixed with methacrylic acid in advance having 2% to 8% by weight of methacrylic acid for 100% by weight of the carboxylated acrylonitrile butadiene latex.

13. A step-by step manufacturing process for making elastomeric rubber thin film glove without using sulfur and accelerators comprising the following steps:
   a. dipping a dry mould/former into a coagulant solution containing calcium ions from 8-17% for 15 secs;
   b. dipping or partially drying the coagulant coated mould/former (50-70 degree C);
   c. dipping the coagulant-coated mould/former into the compounded latex formulation according to claim 1 for 20 secs at 30 degree C.;
   d. drying the elastomeric compounded latex dipped mould/former at 80-120degree C.; and
   e. curing the resulting elastomeric thin film without using sulfur and accelerators on the mould/former at 120-150 degree C. for 20-30 minutes.

14. The process according to claim 13, wherein the mould/former is a hand-shape former and the sulfur-free and accelerator-free elastomeric thin film is in the shape of a glove.

15. The glove produced according to claim 14 cured without use of any sulfur and accelerators in the formulation.

16. The sulfur-free and accelerator-free elastomeric glove produced according to claim 14, wherein the glove has a thickness between 0.05 to 0.15 mm.

17. The sulfur-free and accelerator-free elastomeric glove produced according to claim 14, wherein the glove has an unaged tensile stress between 22 and 26 MPa and an elongation at break between 580 to 620%.

18. The elastomeric glove produced without using sulfur and accelerators according to claim 14, wherein the glove has a 500% modulus between 10 to 15 MPa.

19. The elastomeric glove produced according to claim 14, wherein the glove does not contain Type-IV hypersensitivity generated accelerators.

20. The elastomeric glove produced without using sulfur and accelerators according to claim 13, wherein the glove reduces skin irritation compared with a glove crosslinked using sulfur and accelerators.

21. The elastomeric glove produced without using sulfur and accelerators according to claim 13, wherein the glove meets FDA low dermatitis potential claim.

\* \* \* \* \*